ically standard dimensions, such for in-
UNITED STATES PATENT OFFICE.

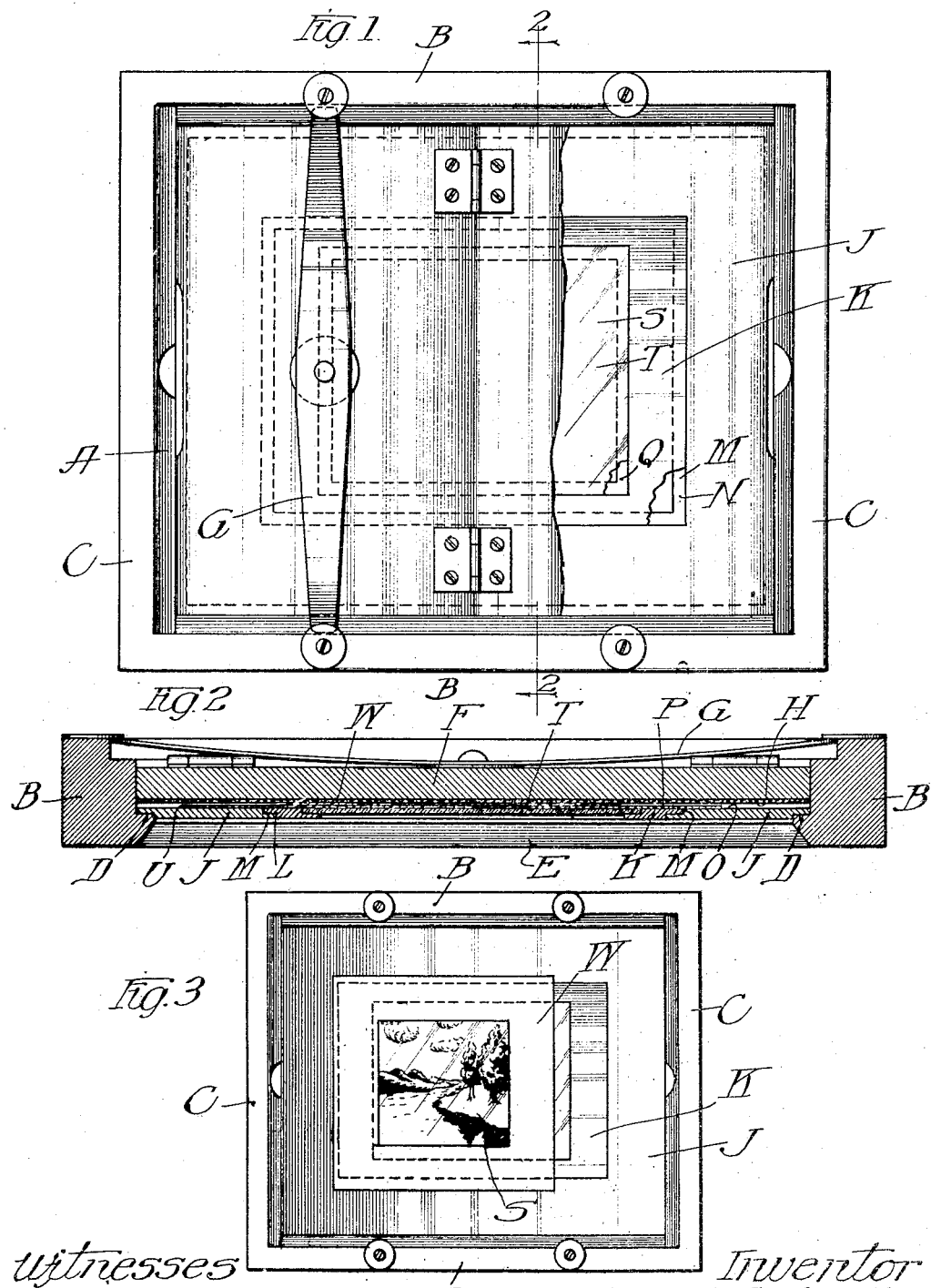

FREDERICK S. TYRRELL, OF WINNETKA, ILLINOIS.

PHOTOPRINTING APPARATUS.

1,252,513.   Specification of Letters Patent.   Patented Jan. 8, 1918.

Application filed November 29, 1915. Serial No. 64,187.

*To all whom it may concern:*

Be it known that I, FREDERICK S. TYR-RELL, a citizen of the United States, residing at Winnetka, in the county of Cook and State of Illinois, have invented certain new and useful Improvements in Photoprinting Apparatus; and I do hereby declare the following to be a full, clear, and exact description of the invention, such as will enable others skilled in the art to which it appertains to make and use the same.

My invention relates to the art of photographic printing and has special reference to improvements in photographic printing apparatus or frames.

The object of my invention is to provide a photo printing apparatus for use with photo masks, which shall permit the exposure of any predetermined surface area of the negative without any alteration in the mask except a lateral shifting thereof.

A further object of my invention is to provide a printing apparatus or frame which shall greatly reduce the number of parts necessary to provide for printing from negatives of the several standard dimensions, in other words, to provide a single frame or apparatus which can be quickly arranged to receive negatives of several different sizes, and which shall permit a free lateral shifting of masks, used therewith, to expose a predetermined surface area of the negative.

My invention resides in a printing frame provided with a removable kit of auxiliary frames adapted to receive and center glass negatives of several sizes, the apparatus being arranged to present a flat or even surface to receive the sheet upon which it is desired to print, and upon which surface a photo mask can be freely shifted laterally in all directions to expose a predetermined surface area of the negative.

My invention also consists in a photographic printing frame having a negative support and provided with one or more removable auxiliary negative holders adapted to be held in the main frame with their inner surfaces lying in a single plane and provided with countersunk central openings to receive smaller negatives than that designed to be held on the negative support and position the sensitized surfaces of the smaller negatives substantially in the plane of the rear faces of the auxiliary holders to permit photo masks to be shifted laterally to expose any predetermined surface area of a negative held in any of the auxiliary frames.

My invention will be more readily understood by reference to the accompanying drawings forming part of this specification, and in which:

Figure —1— is a rear plan view of a photo printing frame embodying my invention, a portion of the backing being broken away to disclose the several auxiliary frames;

Fig. —2— is an enlarged cross section on the line 2—2 of Fig. —1—; and

Fig. —3— is a rear view of the frame, the backing and printing paper being removed.

Glass negatives are ordinarily made and used in several different sizes which are of practically standard dimensions, such for instance as 8"x10", 5"x7" and 4"x5". I have illustrated my invention by a frame which is arranged to hold these several standard sizes of negatives. It will be obvious that my invention can as readily be embodied in frames adapted to hold negatives of other and different relations and dimensions as well as those selected.

My improved photo printing apparatus consists of a rigid rectangular outer or main frame A made up of side bars B and end bars C firmly and rigidly connected together at their corners. The main frame is provided with an inwardly projecting relatively narrow ledge D which is continuous around the inner edge of the frame, it is arranged close to the front E thereof, and is adapted to receive the largest negative intended to be held in the frame. The negative with the printing paper is adapted to be clamped in the frame A upon the ledge D in the usual manner by means of a backing board F and the spring clamping bars G carried thereby.

The backing board is preferably of the divided and hinged kind to permit the ready inspection of the print. The backing board is faced with a yielding pad H for contact with the printing paper and the negative support.

To arrange the frame to receive negatives of smaller dimensions I provide a kit of auxiliary holders fitting one within the other and adapted to fit in and be held by the main frame, each of said auxiliary holders being adapted to receive and hold negatives of certain predetermined dimensions. In the drawings I have shown a kit composed of two of these auxiliary holders J and K. The outside dimensions of the larger auxiliary holder J are substantially the same as the maximum sized negative and it fits within the main frame. At its inner edge it is provided with a depressed or sunken ledge L bordered by a vertically extending wall M and thereby a countersunk central opening N is provided to receive and hold a negative which is smaller than the maximum sized negative. The depth of this space N is substantially the same as the thickness of the glass negative which it is adapted to receive, and consequently, when the negative is held therein the sensitized surface of the negative is flush with the inner flat surface O of the auxiliary holder J, and these two surfaces lie in a single plane. While I have shown this holder J as removable it may be properly be termed a negative support of the main frame for whether it is removable or not does not materially affect my invention in so far as it relates to the use of a photo mask. The relatively wide, free surface which surrounds the central opening permits the free lateral shifting of a mask to expose any predetermined surface area of a negative position in the holder J. Instead of illustrating a negative in the space N I have shown the auxiliary holder K as occupying this position, the outer edge of the holder K is just thick enough to fill the space N, and position the inner surface P of the holder K flush with, or in the same plane as the inner face O of the auxiliary holder J. The inner periphery of the auxiliary holder K, like the holder J, is provided with a depressed ledge Q, which is similar to the ledge L of the holder J and is adapted to form a countersunk central opening to receive and hold a small negative S with its rear face T in the same plane as the inner face of the two auxiliary holders J and K.

The auxiliary holder of my invention may be described as a thin rectangular flat frame having a countersunk central opening adapting it to receive a negative and position the sensitized surface of the negative flush with the back of the frame, and a thin outwardly extending flange at its outer edge with its rear face also flush with the back of the holder and of a thickness to position the holder in a larger similar holder with the rear faces of the two holders in the same plane.

As clearly illustrated in the drawings the printing paper U is laid directly upon the back of the negative, and if it should overlap the edge thereof no harm can follow when the paper is clamped between the negative and backing for the surrounding surface is in the same plane as the rear surface of the negative, but the greatest advantage accrues when it is desired to use a thin paper mask such as W, for the purpose of exposing a predetermined limited portion of the negative and printing only a selected part thereof. In such a case it is frequently necessary that the thin paper mask should be shifted laterally in any direction and usually, as shown, extends beyond the outer edge of the negative and over the surrounding surface, and it is, therefore, essential that the surrounding surface should lie in substantially the same plane as the sensitized surface or rear face of the negative. By means of my invention I am enabled to provide such a surface for the mask to rest upon, and the mask can be positioned to expose the desired portion of the negative without resort to the common method of cutting or folding the mask, and consequently the mask is positioned and held without damage thereto.

As many modifications of my invention will readily suggest themselves to one skilled in the art I do not limit or confine my invention to the specific structures herein shown and described.

I claim:—

1. A photo printing frame having an internal ledge for holding a negative, a yielding backing member for holding a printing sheet on a negative positioned on said ledge, in combination with a kit of auxiliary frames for smaller negatives adapted to be held one within another, the larger thereof being adapted to be held on said ledge, said auxiliary frames having their rear faces in a single plane and each provided at its inner periphery with a sunken ledge adapting it to receive a negative and position the sensitized surface thereof in said plane of the rear faces of said auxiliary frames, the flat surface formed by the rear faces of the auxiliary frames and negative held therein being adapted to receive a thin photo mask, and permit a lateral shifting of the mask in all directions to expose a predetermined surface area of a negative positioned in one of said auxiliary frames.

2. A photo printing frame having an internal ledge for receiving a negative in combination with a kit of nested auxiliary negative holders, the larger thereof adapted to be supported on said ledge and each having an internal sunken ledge to receive a negative and hold the said negative with its rear face in the plane of the rear face of its auxiliary holder, each of the holders having a thin external flange adapted to be received on the negative ledge of the next larger holder and said flanges being proportioned to hold the rear faces of the several auxiliary holders in a single plane, thereby providing a flat surface to receive a photo mask and permit the mask to be shifted laterally in all directions to expose a predetermined area, of a negative held in one of said holders.

In testimony whereof I have signed my name in presence of two subscribing witnesses.

FREDERICK S. TYRRELL.

Witnesses:
M. M. BOYLE,
R. W. LOTZ.

Copies of this patent may be obtained for five cents each, by addressing the "Commissioner of Patents, Washington, D. C."